United States Patent

Kashiwamura et al.

[11] Patent Number: 5,857,750
[45] Date of Patent: *Jan. 12, 1999

[54] SEAT DEVICE

[75] Inventors: Takayoshi Kashiwamura; Akira Homma; Nozomu Munemura; Toshimichi Hanai; Kazuhito Kato, all of Yokohama; Kozo Yamaura, Fujisawa, all of Japan

[73] Assignees: NHK Spring Co., Ltd; Nissan Motor Co., Ltd., both of Kanagawa-ken, Japan

[*] Notice: The term of this patent shall not extend beyond the expiration date of Pat. No. 5,692,727.

[21] Appl. No.: 616,034

[22] Filed: Mar. 14, 1996

[30] Foreign Application Priority Data

Mar. 15, 1995 [JP] Japan ................................. 7-55944

[51] Int. Cl.⁶ ................................. A47C 7/02; A47C 7/35
[52] U.S. Cl. ................................. 297/452.55; 297/452.52; 267/103; 267/143; 248/608
[58] Field of Search ................... 297/452.49, 452.52, 297/452.55, 284.4, 284.7, 284.8; 248/587, 608; 267/102, 103, 142, 143

[56] References Cited

U.S. PATENT DOCUMENTS

| 3,876,194 | 4/1975 | Grosseau | 267/103 |
| 4,606,532 | 8/1986 | Kazaoka et al. | 267/103 |
| 4,636,006 | 1/1987 | Kazaoka et al. | 267/142 |
| 4,709,906 | 12/1987 | Mizelle | 267/142 |
| 5,348,378 | 9/1994 | Zhang | 297/452.49 |
| 5,474,358 | 12/1995 | Maeyaert | 297/284.7 |
| 5,490,718 | 2/1996 | Akizuki et al. | 297/452.49 |

FOREIGN PATENT DOCUMENTS

| 5-15232 | 4/1993 | Japan . |
| 6-250016 | 4/1996 | Japan . |

Primary Examiner—Peter M. Cuomo
Assistant Examiner—Anthony D. Barfield
Attorney, Agent, or Firm—McDermott, Will & Emery

[57] ABSTRACT

A seat device comprises a cushion frame mounted on a floor; a support member for supporting a seat pad; and torsion bars for elastically supporting the support member on the cushion frame, including a torque bar section and an arm section, wherein the torsion bars are provided at the front and rear positions of the seat or at the left and right positions thereof by at least one pair, and each arm section of the at least one pair of torsion bars be provided so as to form a parallel link mechanism.

10 Claims, 11 Drawing Sheets

000
SEAT DEVICE

BACKGROUND OF THE INVENTION

The present invention relates to a seat device for elastically supporting, by one or more torsion bars, a support member such as a support panel or the like which supports a seat pad.

DESCRIPTION OF RELATED ART

An example of a conventional seat suspension device is shown in FIGS. 1 and 2, and disclosed in Japanese Examined Utility Model publication No. Hei 5-15232). This seat device has been used as a seat for an automobile for example, which includes a cushion frame 101, a support member 103, and a torsion bar 105 disposed at the four corners. The cushion frame 101 is mounted on a floor side. The support member 103 consists of support pipes 107 on both sides of a seat in the width direction thereof, and S springs 109 tensioned between the support pipes 107. The torsion bar 105 consists of a torque bar section 111 and an arm section 113. The torque bar section 111 is rotatably supported on the cushion frame 101 by a bracket 115, and one end of the torque bar section 111 is fitted to a through hole 119 provided in the cushion frame 101. The arm section 113 is integrally provided on the other end of the torque bar section 111, and the tip section 121 of the arm section 113 is integrally provided on the other end of the torque bar section 111, and the tip section 121 of the arm section 113 is bent in a direction toward the support pipe 107 and is fitted to the support pipe 107 with play.

Thus, when an occupant is seated on a seat, the arm section 113 is rotated downward as shown in FIG. 2, whereby the torque bar section 111 is twisted and the support member 103 and a seat pad (not shown) come to a standstill at a position where the reaction force is balanced with downward load due to seating. Further, when vibration is given, the vibration can be absorbed by the torsion bar 105.

However, in a case where a seat device has the above-mentioned structure, when the arm section 113 of the torsion bar 105 is rotated in the vertical direction, with the torque bar section 111 side centered, as shown by two-dot chain line in FIG. 2, the tip portion 121 of the arm section 113 is moved in the directions to leave the support pipe 107. Accordingly, the relative movement between the support pipe 107 and the tip portion 121 of the arm section 113, fitted to the support pipe 107 consists of the combination of their mutual rotations and such movement that the tip portion 121 pulls the support pipe 107 outside in the seat width direction. Thus, when the support member 103 is vibrated vertically, friction between the tip portion 121 and the support pipe 107 is rapidly increased, thereby being likely to give a discontinuous feeling in bending to the occupant and bad effects on vibration properties, on sealing.

SUMMARY OF THE INVENTION

Therefore, it is an object of the present invention to provide a seat device which can ensure more comfortable ride and vibration breaking properties.

To solve the above-described object, according to a first aspect of the present invention, there is provided a seat device comprising: a cushion frame mounted on a floor, a support member for supporting a seat pad, and torsion bars for elastically supporting said support member on said cushion frame, including a torque bar section and an arm section, said torsion bars being provided at the front and rear positions of the seat or at the left and right positions thereof by at least one pair, and each arm section of said at least one pair of torsion bars being provided so as to form a parallel link mechanism.

According to a second aspect of the present invention, there is provided a seat device wherein said torque bar sections of said one pair of torsion bars are extendedly provided at the front and rear positions of the seat or at the left and right positions thereof and provided parallel to each other in a slight distance offset.

According to a third aspect of the present invention, there is provided a seat device, wherein a rigidity reducing means for reducing the rigidity in a direction along a line which passes through both ends of said arm section is provided with said arm section, or rigidity reducing means for reducing the rigidity in a sharing direction between the tip portion of said arm section and said support panel is provided therebetween.

According to a fourth aspect of the present invention, there is provided a seat device wherein said rigidity reducing means is a flex portion provided in said arm section.

According to a fifth aspect of the present invention, there is provided a seat device wherein said rigidity reducing means is an elastic body provided between the tip portion of said arm section and said support panel.

According to a sixth aspect of the present invention, there is provided a seat device, wherein said at least one pair of torsion bars provided at the front and rear positions of the seat or at the left and right positions thereof, are provided at the front and rear positions of the seat or at the left and right positions thereof by one pair, said torsion bars providing connecting members which connect both of the arm section sides thereto to substantially synchronous movement.

According to a seventh aspect of the present invention, there is provided a seat device, wherein a relief portion for relieving unevenness of said arm section is provided in said cushion frame.

According to an eighth aspect of the present invention, there is provided a seat device which includes bar holding members which rotatably hold said torsion bars on said cushion frame, and wherein said torsion bars are continued with provision of a torque bar section and arm section having a round portion respectively, and said bar holding members holding said torque bar section and said arm section.

According to a ninth aspect of the present invention, there is provided a seat device, wherein the sum of the distance between centers of the torque bar sections in the torsion bars and one arm length of the respective arm sections forming the parallel link mechanism is set to be a little larger than the sum of the distance between support portion centers of the respective arm sections for the support panel and the other arm length of the respective arm sections.

According to a tenth aspect of the present invention, there is provided a seat device comprising: a cushion frame mounted on a floor, a support member for supporting a seat pad, and torsion bars for elastically supporting said support member on said cushion frame, said support member providing arm supporting brackets, the tip portion of said arm section formed in the seat longitudinal direction or in the seat width direction, being rotatably fittedly supported on said arm support brackets, and a rigidity reducing means for reducing the rigidity in a direction along a line which passes through both ends of said arm section being provided with said arm section, or a rigidity reducing means for reducing the rigidity in a sharing direction between the tip portion of said arm section and said support panel being provided therebetween.

According to an eleventh aspect of the present invention, there is provided a seat device, wherein said torsion bars are disposed on the front side and rear side of the cushion frame, and the sum of the distance between torque bar centers of the front and rear torsion bars of the cushion frame section and the arm length of the front torsion bar, is set to be a little larger than the sum of the distance between centers of the front and rear arm supporting portions for the support panel and the arm length of the rear torsion bar.

According to the above-mentioned first aspect of the invention, torsion bars supports a load on the support member side, with respect to the cushion frame, and the torsion bars absorb vibration when the vibration is given. When the torsion bars support the load on the support member side, or they move due to the vibration absorption when the vibration is given, the respective arm sections act as parallel link mechanisms, and can follow the vertical movement of the support member. Therefore, only a relative movement between the respective arm sections and the support member, or only a relative movement between the respective arm sections and the cushion frame can be executed. Thus, friction between the respective arm sections and the support member, or between the respective arm sections and the cushion frame can be reduce.

According to the second aspect of the invention, in addition to the effects of the first aspect, length of the torque bar can be lengthened in the seat longitudinal direction or the seat width direction.

According to the third aspect of the invention, in addition to the effects of the first or second aspect of the invention, when a load is acted on the arm section of the torsion bar from the support member, a rigidity reducing means accepts substantially vertical directional deformation of the arm section, or movement with respect to the support member can be accepted. Accordingly, a load on the tip portion of the arm section can be reduced. Additionally, even if parallelism between the seat cushion frame and the torsion bar is broken a little, the deformation can be accepted by the rigidity reducing means, the torsion bars do not become supports or the like, and comfortable ride can be always obtained.

According to the fourth aspect of the invention, in addition to the effects of the third aspect of the invention, the arm section can be deformed at the flex portion thereof, whereby the load which acts on the tip portion of the arm section can be reduced.

According to the firth aspect of the invention, in addition to the effects of the third aspect of the invention, the load which acts on the tip portion of the arm section can be reduced.

According to the sixth aspect of the invention, in addition to the effects of any one of the first to fifth aspects of the invention, the movement of the arm sections of at least one of the torsion bars can be substantially synchronized to each other, whereby rotational rigidity in the seat rolling direction or rotational rigidity in the pitching direction can be enhanced.

According to the seventh aspect of the invention, in addition to the effects of any one of the first to sixth aspects of the invention, the unevenness against the cushion frame can be relieved by a relief portion, when the arm portion is deformed. Accordingly, friction of the arm section against the arm section can be prevented.

According to the eighth aspect of the invention, in addition to the effects of any one of the first to seventh aspects of the invention, the torque bar section can be positively supported by holding the torque bar section by a bar holding member, as far as a position near the round portion which is the boundary of the arm section.

According to the ninth and eleventh aspects of the invention, in addition to the effects of any one of the first to eighth aspects of the invention, rapid deformation of the other arm section can be suppressed.

According to the tenth aspect of the invention, substantially vertical directional rigidity of the arm section can be reduced by the rigidity reducing section provided in the arm section. Accordingly, when a load acts on the arm section from the support member, deformation of the arm section is accepted by the rigidity reducing section, whereby press force of the tip portion against the support member side can be suppressed.

BRIEF DESCRIPTION OF DRAWINGS

FIGS. 11A and 11B are enlarged views of a main portion of a seat device according to a third example of the present invention, wherein FIG. 11A is a front view thereof and FIG. 11B is a side view thereof;

DESCRIPTION OF THE PREFERRED EMBODIMENTS

Examples of seat devices according to the present invention will now be described as preferred embodiments.

First Example (embodiment)

Figure 1:
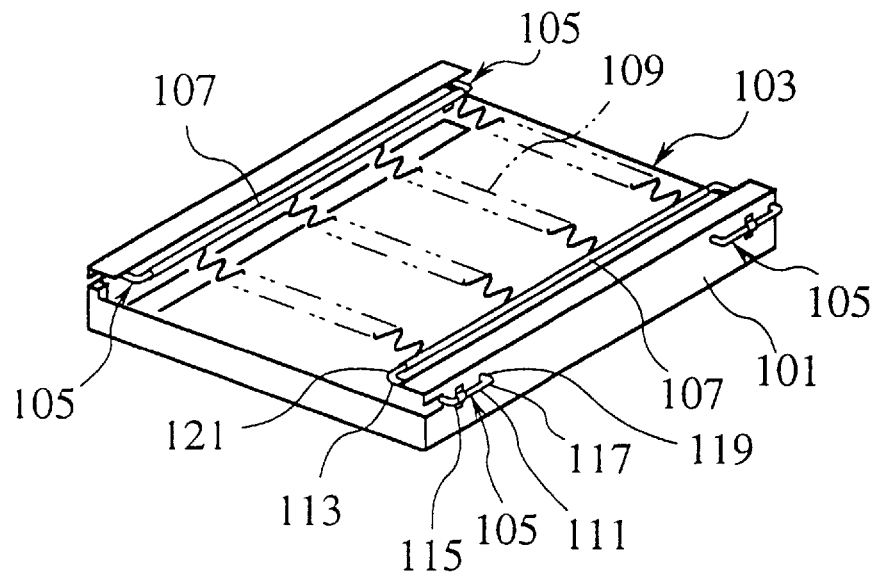
FIG. 1 is a perspective view showing a seat device according to a conventional example.
Figure 2:
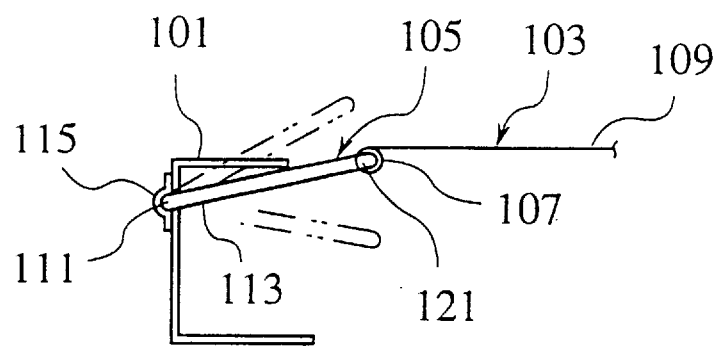
FIG. 2 is a main portion of the seat device according to the conventional example.
Figure 3:
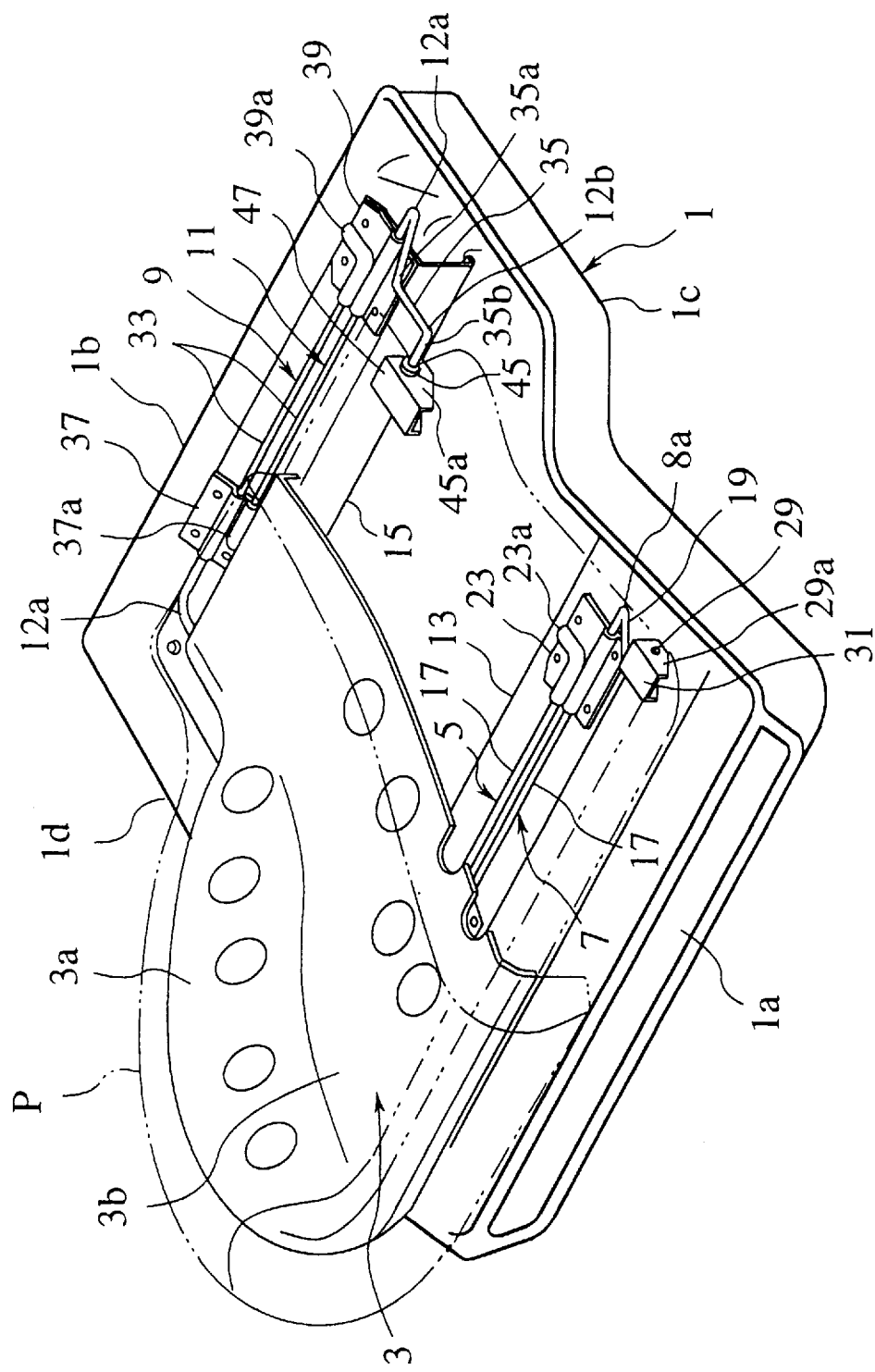
FIG. 3 is a perspective view of a seat device according to a first example of the present invention.
Figure 4:
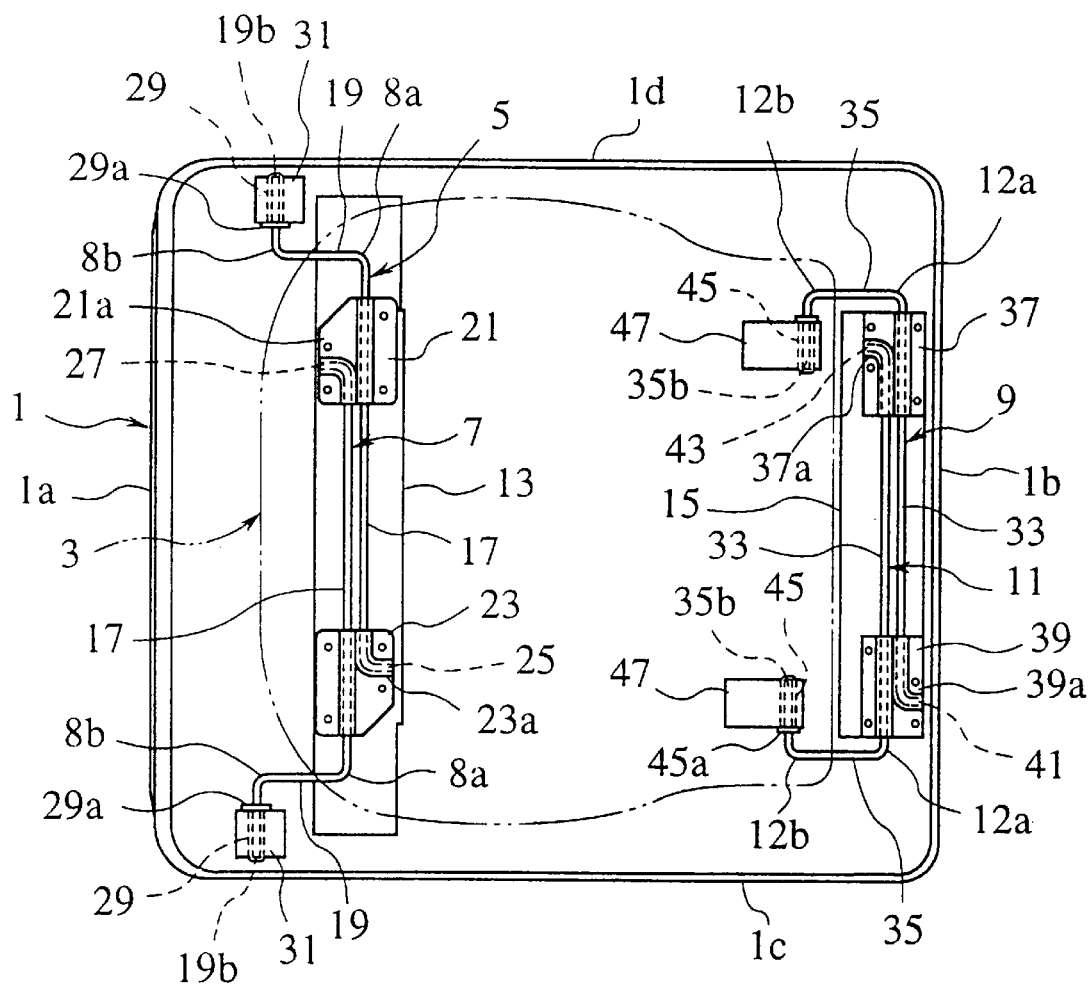
FIG. 4 is a plan view of a seat device according to a first example of the present invention.
Figure 5:
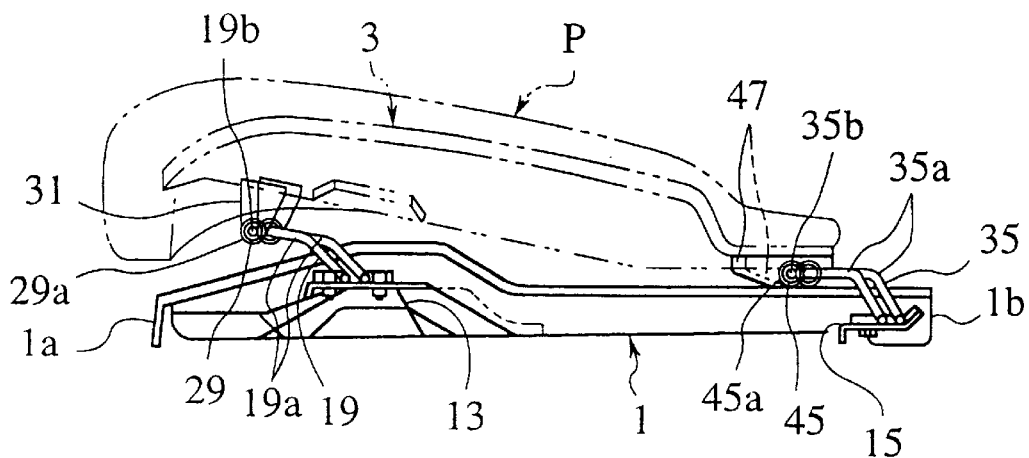
FIG. 5 is a side view of a seat device according to a first example of the present invention.

FIG. 3 shows a schematic whole perspective view of a seat device according to a first example of the present invention, FIG. 4 is a plan view of the same seat, and FIG. 5 is a side view thereof.

The seat device is applied to, for example, a seat for a vehicle. The seat device for the vehicle of this first example includes a cushion frame 1, a support panel 3 which is a support member. The four corners of the support panel 3 are elastically supported on the cushion frame 1, by torsion bars of a right front torsion bar 5, a left front torsion bar 7, a right rear torsion bar 9 and a left rear torsion bar 11.

The cushion frame 1 is formed in a concave-shaped section, which has front, rear, left and right walls 1a, 1b, 1c, and 1d. A front bracket 13 for supporting front fittings is provided in the front section of the cushion frame 1, and a rear bracket 15 for supporting rear fitting is provided in the rear section thereof. The support panel 3 has a bank section 3a on both sides thereof in a seat width direction and a concave central section 3b in a concave cross-section. The right front torsion bar 5 is disposed at the right front section in the seat width direction, and the left front torsion bar 7 is disposed at the left front section in the same direction. The right rear torsion bar 9 is disposed at the right rear section in the seat width direction, and the left rear torsion bar 11 is disposed at the left rear section in the same direction. The right front torsion bar and the left front torsion bar have substantially symmetrical shapes to each other, and also the right rear torsion bar and the left front torsion bar have substantially symmetrical shapes to each other, and also the right rear torsion bar and the left rear torsion bar have substantially symmetrical shapes to each other.

The right front torsion bar 5 and the left front torsion bar 7 include a torque bar section 17 and an arm section 19. The torque bar section 17 and the arm section 19 of the torsion bars 5 and 7 are continued with a round portion 8a. Lengths of the respective arm sections 19 are the same. Each torque bar section 17 is disposed on a front bracket 13 for holding fittings and is provided lengthwise in the seat width direction. Each of the torque bar sections 17 is rotatably supported on the front bracket 13 for holding fittings by fittings 21 for holding the right front torsion bar and fittings 23 for holding the left front torsion bar. The fittings 21 for holding the right front torsion bar and the fittings 23 for holding the left front torsion bar are fixed to the front bracket 13 for holding fittings, with bolts and nuts, or the like. The respective torque bar sections 17 are provided parallel to each other, in a manner that they are offset by a small size, in the seat longitudinal direction. Accordingly, the torque bar section 17 having a sufficient length can be ensured in a limited space in the seat width, whereby durability of the torsion bars 5 and 7 can be enhanced. The torque bar section 17 of the right front torsion bar 5 is bent backward in a portion near the seat width directional left end side, and has an engagement portion 25. This engagement portion 25 is fitted to an engaging support section 23a provided in the fittings 23 for holding the left front torsion bar. On the other hand, the end portion near the seat width directional right side of the left front torsion bar 17 is bent forward, and has an engagement portion 27. This engagement portion 27 is also fitted to an engaging support section 21a provided in the fittings 21 for holding the left front torsion bar.

Each arm section 19 is positioned at the seat width directional outer end side portion of each torque bar section 17, and extends upward on the support panel 3 side. A flex portion 19a which acts as a rigidity reducing portion and a rigidity reducing means, is provided in the middle portion of the arm section 19. The upper end portion 19b of each arm section 19 is bent outward in the seat width direction, so as to have a round portion 8b, so that the arm sections 19 are formed in the seat width direction. Each upper end portion 19b is rotatably supported on each front arm supporting bracket 31 through the collar 29. The front arm supporting bracket 31 is fixed to the lower surface of the support panel 3 with bolts and nuts or the like. The collar 29 has a cylindrical shape with a bottom, and has a circumferential flange 29a at the tip thereof. The circumferential flange 29a engages with the inner surface of the arm supporting bracket 31 of the seat width direction. The respective upper end portions 19b are positioned by contact to the bottom of the collar 29.

The right rear torsion bar 9 and the left rear torsion bar 11 include a torque bar section 33 and an arm section 35. The torque bar section 33 and the arm section 35 are continued with a round portion 11a. Lengths of the respective arm sections 35 are the same. Each torque bar section 33 is disposed on a rear bracket 15 for holding fittings and is provided lengthwise in the seat width direction. Each of the torque bar sections 33 is rotatably supported on the rear bracket 15 for holding fittings by fittings 37 for holding the right rear torsion bar and fittings 39 for holding the left rear torsion bar. The respective torque bar sections 33 are provided parallel to each other, in a manner that they are offset by a small size, in the seat longitudinal direction. Accordingly, the torque bar section 33 having a sufficient length can be ensured in a limited space in the seat width, whereby durability of the torsion bars 9 and 11 can be enhanced. The fittings 37 for holding the right rear torsion bar and the fittings 39 for holding the left rear torsion bar are fixed to the rear bracket 15 for holding fittings, with bolts and nuts, or the like. The fittings 37 for holding the right rear torsion bar and the fittings 39 for holding the left rear torsion bar support portions near the round portion 12a of the left rear torsion bar 11. Thus, the respective lower portions of the arm sections 35 are positively supported by both fittings 37 and 39 for holding torsion bars, whereby movement of the arm sections 35 can be ensured. Also, fittings 23 and 24 for holding the left and right front torsion bars can be held near the round portions 8a of the left and right front torsion bars 7 and 5 respectively. The torque bar section 33 of the right rear torsion bar 9 is bent backward in a portion near the seat width directional left end side, and has an engagement portion 41. This engagement portion 41 is fitted to an engaging support section 39a provided in the fittings 39 for holding the right rear torsion bar. On the other hand, the end portion near the seat width directional right side of the left rear torsion bar 11 is bent forward, and has an engagement portion 43. This engagement portion 43 is also fitted to an engaging support section 37a provided in the fittings 37 for holding the left rear torsion bar. Each arm section 35 is positioned at the seat width directional outer end side portion of each torque bar section 33, and extends upward on the support panel 3 side. A flex portion 35a which acts as a rigidity reducing portion and a rigidity reducing means, is provided in the middle portion of the arm section 35. The upper end portion 35b of each arm section 35 is bent inward in the seat width direction, so as to have a round portion 12b, so that the arm sections 19 are formed in the seat width direction. Each upper end portion 35b is rotatably supported on a rear arm supporting bracket 47 through the collar 45. The collar 45 has a cylindrical shape with a bottom, and has a circumferential flange 45a at the tip thereof. The circumferential flange 45a engages with the outer surface of the rear arm supporting bracket 47 of the seat width direction. The respective upper end portions 35b of the arm sections 35 are fixed to the collars 45, and the tip portions thereof are positioned by contact to the bottoms of the collars 45. The rear arm supporting bracket 47 is fixed to the lower surface of the support panel 3 with bolts and nuts or the like.

Specifically, in the first example of the invention, the respective arm sections of at least one pair of torsion bars are provided to form a parallel link mechanism. Namely, an inclination angle formed by the arm section 19 of the right front torsion bar 5 and the arm section 35 of the right rear torsion bar 9, and inclination angle formed by the arm section 19 of the left front torsion bar 7 and the arm section 35 of the left rear torsion bar 11 are set to be substantially the same, whereby the whole arm sections form a parallel mechanism in the seat longitudinal direction.

Figure 6:
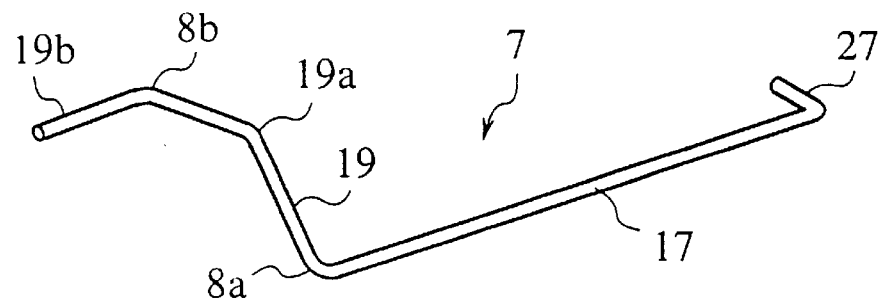
FIG. 6 is a perspective view of a left front torsion bar according to the first example of the present invention.
Figure 7A:
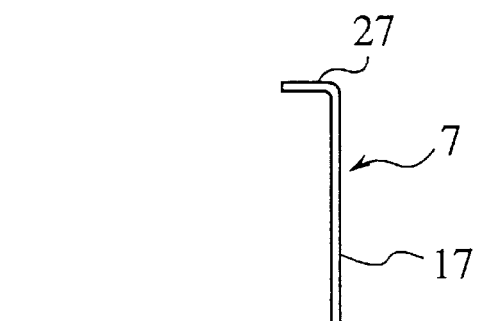
FIG. 7 is a plan view of a torsion bar according to the first example of the invention and a side view thereof.
Figure 7B:
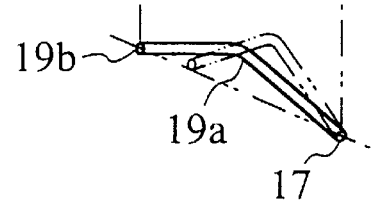

The flex portion 19a of the left front torsion bar 7 is shown in FIGS. 6, 7A and 7B. FIG. 6 is a perspective view of the left front torsion bar 7, and FIG. 7a is a plan view, and FIG. 7B is a side view. As shown in FIGS. 6, 7A and 7B, the flex portion is provided at a certain portion of the arm section 19. The flex portion 19a is flexed backward. In this connection, structures of flex portions 19a and 35a of the right front torsion bar 5 and the left and right rear torsion bars 9 and 11 are substantially the same as those shown in FIGS. 6, 7A and 7B.

The effects or operations will be then described. When the occupant is seated on a seat. A load acts on the front and rear arm supporting brackets 31 and 47. A load acts on the right front torsion bar 5 and the left front torsion bar 7 from the front arm supporting brackets 31. On the other hand, a load acts on the right rear torsion bar 9 and the left rear torsion bar 11 from the rear arm supporting bracket 47. Accordingly, each of the torsion bars 5, 7 9 an 11 is bent, and at a point where the loads are balanced, the support panel 3 and a seat pad (not shown) come to a standstill. The arm lengths of the arm sections 19 and 35 of the respective torsion bars 5, 7, 9 and 11 are set to be substantially the same. Thus, it is possible to maintain falls of the front and rear sides of the support panel 3, constant with respect to the first angle. When vibration is given from the floor side, it is input into each of the torsion bars 5, 7, 9 and 11, and the input vibration is absorbed by each of the torsion bars 5, 7, 9 and 11, thereby breaking the vibration. Therefore, existence of the respective torsion bars 5, 7, 9 and 11 further improves a comfortable ride of the occupant.

Since, in this first example, each of the arm sections 19 and 35 is particularly provided to be a parallel link mechanism, friction in the longitudinal direction, between the upper end or tip portions 19b and 35b of the respective arm sections 19 and 35, and the respective arm supporting brackets 31 and 47, can be remarkably reduced. That is, when the support panel 3 moves vertically, the respective arm sections 19 and 35 move, so that they ar rotated in the vertical direction, with the respective fittings 21, 23, 37, and 39 sides centered. Consequently, the respective arm sections 19 and 35, and the respective upper tip portions 19b and 35b are substantially synchronously moved in the vertical direction, by an operation of a parallel link mechanism of the former. Therefore, movement between the respective upper tip portions 19b and 35b, and the respective upper arm supporting brackets 31 and 47 is only a relative rotary motion, and movement of the respective tip portions 19b and 35b, which pull the arm supporting brackets 31 and 47 in the seat longitudinal direction, can be controlled.

Thus, the friction between the respective arm supporting brackets 31 and 47, and the respective upper tip portions can be remarkably suppressed, and a smooth movement of the support panel 3 can be ensured, whereby vibration breaking properties can be enhanced.

Further, when, a parallel link mechanism has a small distortion due to variability in production, since, in the first example, the arm sections 19 and 35 are provided with flex portions 19a and 35a, which reduce the seat rigidity respectively, and additionally, when the occupant is seated on a seat and a load acts strongly against the upper tip portions 19b and 35b of the arm sections 19 and 35 of any one of the torsion bars 5, 7, 9 and 11, the arm section 19 or 35 is bent, as shown by two-dot chain lines in FIGS. 7B and 7B, thereby absorbing an unmatched displacement thereof. Accordingly, a load which acts on the torque bar section 17 or 33 side is reduced and a balance of a spring motion of entire torsion bars 5, 7, 9 and 11 can be held. Thus, a smooth motion of the support panel 3 can be attained. Further, a reaction force between the arm sections 19, 35, and the arm supporting brackets 31, 47, can be reduced by bending of the arm sections 19, 35. Consequently, a smooth motion and vibration breaking properties can be enhanced, and further, an occurrence of irregular sounds derived from friction, can be suppressed.

Second Example

Figure 8:
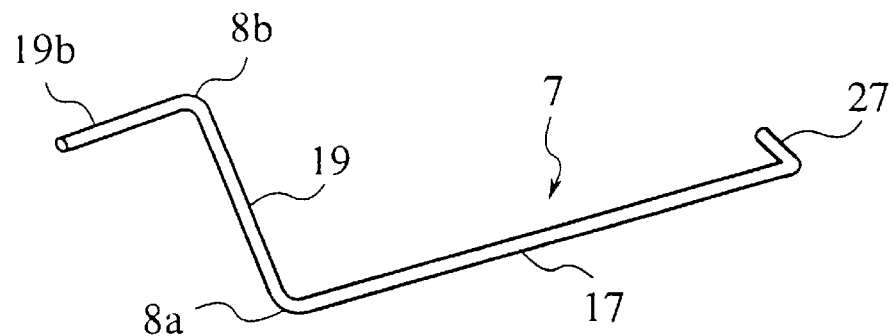
FIG. 8 is a perspective view of a left front torsion bar according to a second example of the present invention.

FIGS. 8 and 9 show a second example. This second example features a modification of the torsion bar. Specifically, FIGS. 8 and 9 show a left front torsion bar 7. However, a right front torsion bar 5, and left and right rear torsion bars 11 and 9 can be also formed in the same manner.

Figure 9A:
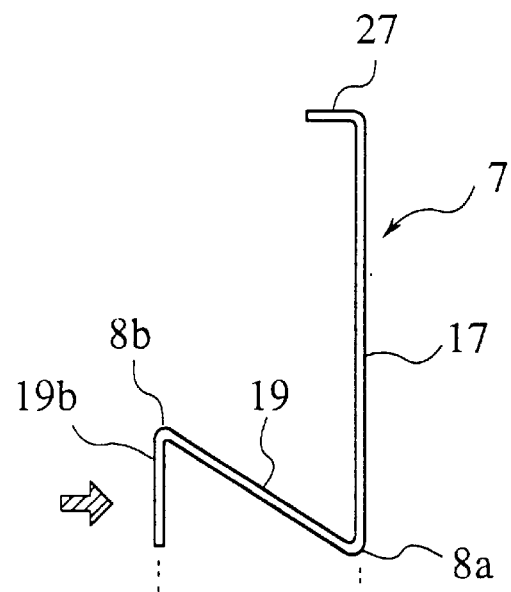
FIG. 9 is a plan view of a torsion bar according to the second example of the invention and a side view thereof.
Figure 9B:
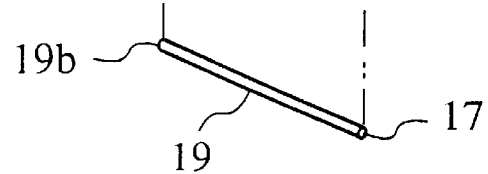

FIG. 8 is a perspective view of the left front torsion bar 7, FIG. 9A is a plan view and FIG. 9B is a side view. As shown in FIGS. 8, 9A and 9B, as a rigidity reducing means of the arm section 19, the arm section 19 is formed in a Z-shape.

Therefore, when a load is acted on the arm section 19, even in this example, the arm section 19 can be deformed a little, in a manner that the z-shape is broken. Accordingly, the same effects and operations as in the above-mentioned first example, can be obtained, even in the second example. In the second example, as the Z-shape arm section 19 can be simply deformed, the structure is very simple.

Third Example

Figure 10:
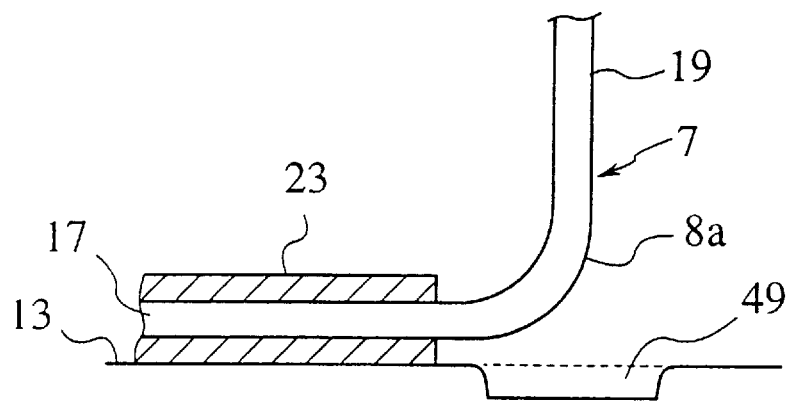
FIG. 10 is an enlarged view of a amain portion of a seat device according to a third example of the present invention.

FIG. 10 shows an enlarged view of a main portion of the third example. FIG. 10 specifically shown an enlarged portion around the round portion 8a of the left front torsion bar 7, for example. However, even in the right front torsion bar 5, and the left and right rear torsion bars 11 and 9 can be the same structure. Now, the left front torsion bar 7 will be explained. As shown in FIG. 10, a concave shaped relief portion 49 is formed in the front bracket 13 for supporting fittings, at a lower side of the round portion 8a of the left front torsion bar 7. Thus, even if, in the third example, the arm section 19 is bent and deformed downward, while being twisted, the relief portion 49 relieves an unevenness from the round portion 8a, whereby an occurrence of friction or irregular sounds can be prevented. Fittings 23 for supporting the left front torsion bar is provided to support the arm section 19 near the round portion 8a. Therefore, the fittings 23 for supporting the left front torsion bar positively supports the arm section 8a with respect to the round portion 19, thereby suppressing movement downward. Consequently, noise due to frictional engagement between the round portion and against the front bracket 13 for the supporting fittings, can be prevented. Any one of structures in which fittings 23 for supporting the left front torsion bar supports the arm section 19 to near the round portion 8a, and of provision of the relief 49, can be selected. The same effects and operations as in the above-mentioned examples can be also obtained in the third example. Additionally, friction between the torsion bars 5, 7, 9 an 11, and the cushion frame 1 is suppressed, and more smooth motion and vibration breaking properties can be enhanced, and further, the occurrence of irregular sounds can be prevented.

Fourth Example

Figures 11A, 11B:
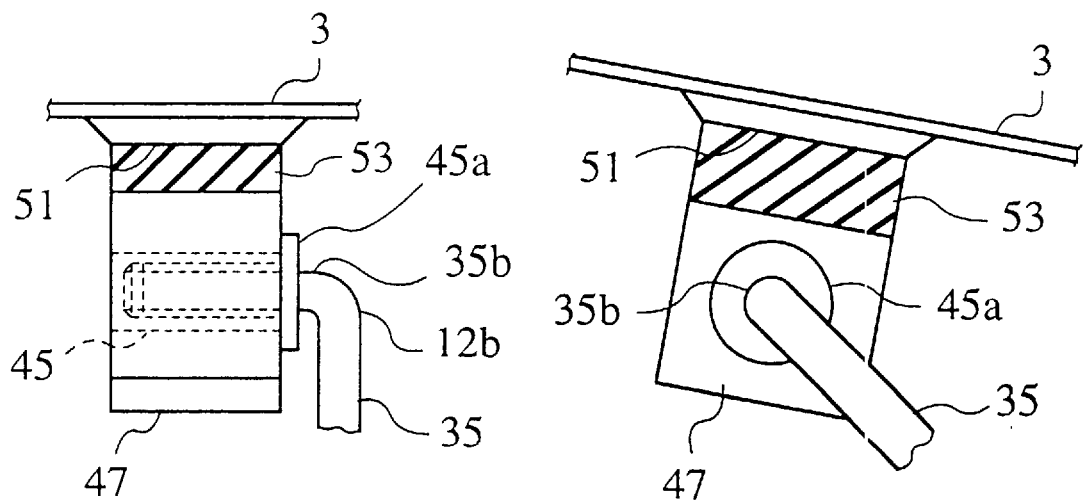
Figure 12:
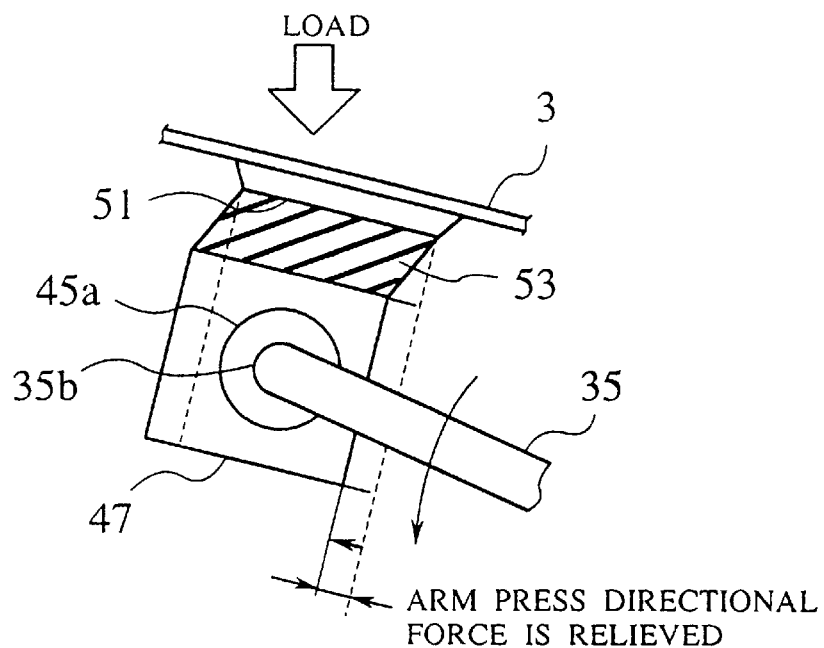
FIG. 12 is an explanatory view of effects according to the fourth example of the present invention.

FIGS. 11A and 11B are enlarged views of a main portion according to the fourth example of the invention. Specifically, FIG. 11A is a front view of the arm section 35 of the left rear torsion bar 9, as it is seen from the back side of the seat, and FIG. 11B is a side view thereof. Further, even in the right rear torsion bar and the left and right front torsion bars, the same structure is used. In the fourth example, a face 51 for attachment is provided on the support panel 3. A rear arm supporting bracket 47 is attached to the face 51 for attachment, through an elastic body 53 such as a rubber or the like. The elastic body 53 is fixed to the rear arm supporting bracket 47 by a bonding therebetween, and also, the elastic body 53 is fixed to the fact 51 for attachment by bonding therebetween. Thus, in this example, a structure is provided, in which as a rigidity reducing means for reducing rigidity at least in a transverse direction of the seat, the elastic body 53 is provided between the tip portion 35b of the arm section 35 and the support panel 3. When a load is acted from the support panel 3 side, as shown by an arrow in FIG. 12, the elastic body 53 is bent, and the load acting on the tip portion of the arm section 35 can be reduced. The same effects and operations as in the above-mentioned first and second examples can be also obtained in the fourth example. Further, in this example, control of the reduction of rigidity can be easily executed by a setting of the elastic body 53.

In the fourth example, as the elastic body for the rigidity reducing means, a rubber bush or the like can be interposed between a collar 45 with a flange 45a and the arm supporting bracket 47.

Fifth Example

Figure 13:
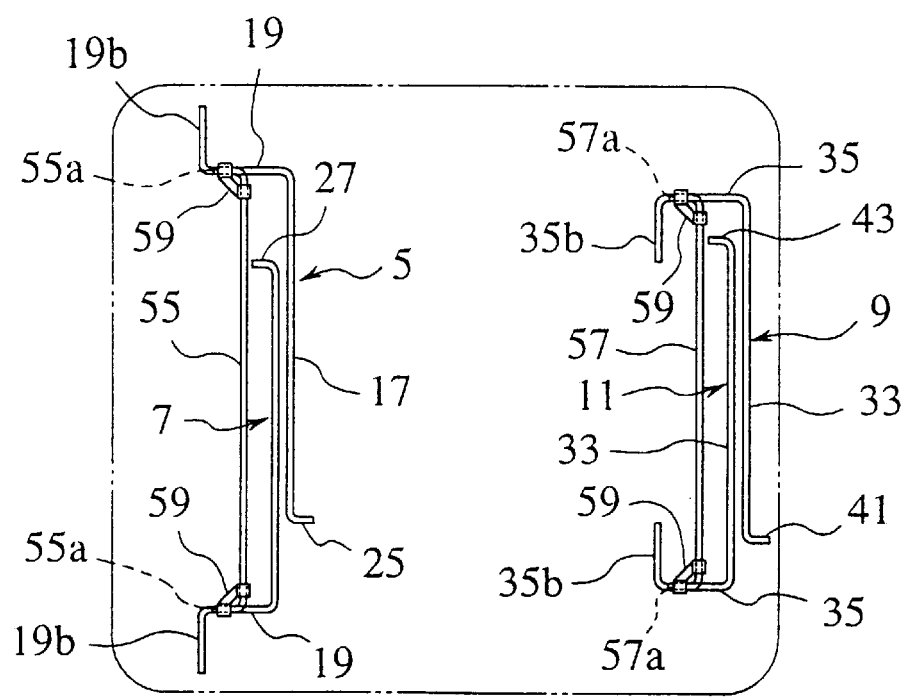
FIG. 13 is a plan view according to a fifth example of the present invention.
Figure 14:
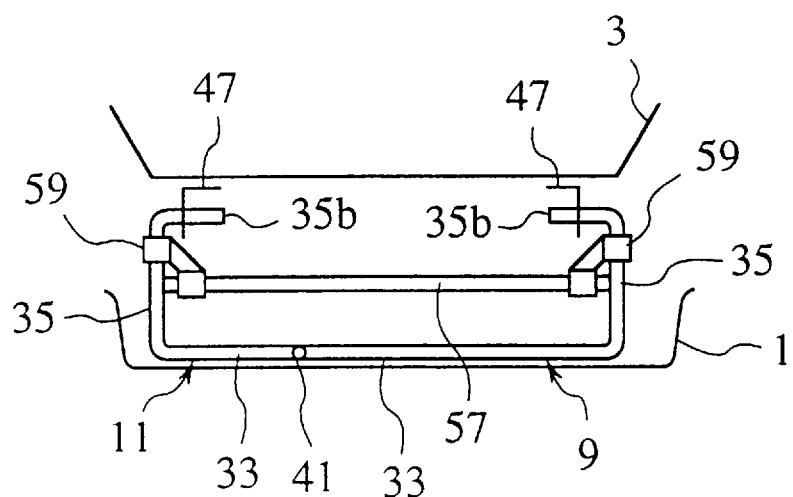
FIG. 14 is a front view according to the fifth example of the present invention.
Figure 15:
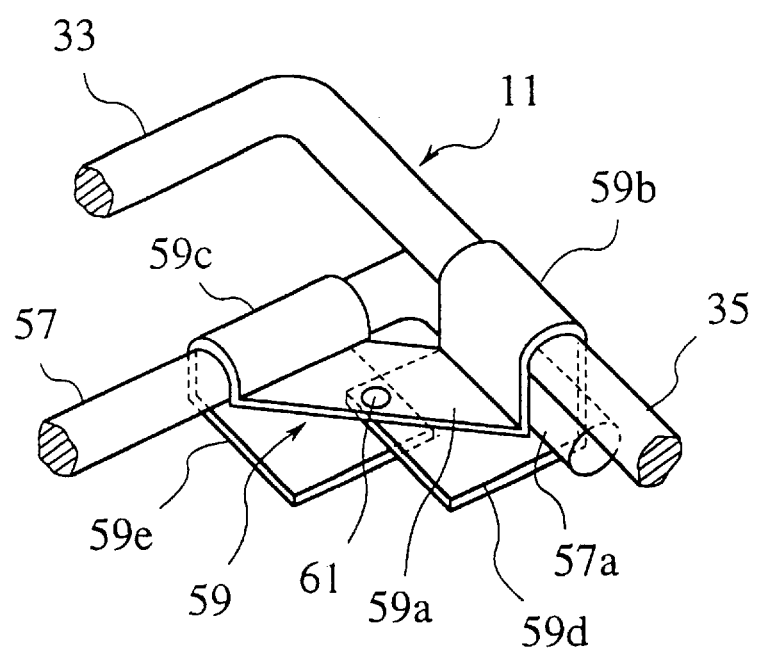
FIG. 15 is a perspective view of a main portion of a seat device according to the fifth example of the present invention.

FIGS. 13 and 15 show a fifth example of the present invention. Particularly, FIG. 13 is a plan view of the front and rear torsion bars 5, 7, 9 and 11, FIG. 14 is a back view, and FIG. 15 is a perspective view of a main portion of the arm section 35 of the left rear torsion bar 11 and sections around thereof.

In the fifth example, arm sections 19 of the left and right front torsion bars 7 and 5 are connected to each other with front connecting members 55. On the other hand, arm sections 35 of the left and right rear torsion bars 11 and 9 are connected to each other with rear connecting members 57. The front and rear connecting members 55 and 57 are made of bars having circular cross-sections, respectively. Both tip portions 55a of the front connecting member 55 are bent to the seat front side, along the arm section 19, and connected to the arm sections 19 with connecting fittings 59. On the other hand, both tip portions 57a of the rear connecting member 57 are bent to the seat front side, along the arm section 35, and connected to arm sections 35 with connecting fittings 59. Since the connection with the connecting fittings is common to the front connecting member 55 and rear connecting member 57, connection of the rear connecting member 57 will be described by using FIG. 15.

FIG. 15 shows a connecting structure in the arm section 35 side of the left front torsion bar 11. As shown in FIG. 15, the connecting fittings 59 has a first and second holding portions 59b and 59c having U-shaped cross sections respectively, at both sides thereof. The first holding portion 59b has a first tongue piece 59d, and the second holding portion 59c has a second tongue piece 59e. The holding portion 59b holds the arm section 35 and the tip portion 57a so as to cover them, and the second holding portion 59c holds the rear connecting member 57 also as to cover it. The first tongue piece 59d and the second tongue piece 59e are overlapped on a base piece 59a, and the three elements are tightly fixed to each other with a rivet 61.

Thus, when, in the example, the support panel 3 is moved upward, the left and right front torsion bars 7 and 5 can be substantially synchronized to each other by the front connecting member 55, and also, the left and right rear torsion bars 11 and 9 can be substantially synchronized to each other by the rear connecting member 57. Accordingly, a higher rotational rigidity in the seat roll direction can be obtained, whereby a very high stability can be attained.

In the fifth example, the left and right torsion bars 7 and 5, or the left and right torsion bars 11 and 9, are connected to each other in a little offset state, with the connecting members 55 and 57, respectively. However, during an upward movement of the support panel 3, the respective arm sections 19 and 35 move a little, in a transverse direction (i.e., in the outward direction or in the inward direction), so that the restriction of movement (stick or the like) does not occur.

When the parallel link mechanism of torsion bars are arranged to function in the seat width direction in the fifth example, rather than the seat longitudinal direction, the rotational rigidity in the seat pitching direction can be enhanced by connecting the arm sections of the front and rear torsion bars, with the connecting members, whereby a very high stability can be also obtained.

Thus, in the fifth example, the same effects and operations as in the above-mentioned firs example, can be obtained. Additionally, the rotational rigidity in the seat roll direction or in the pitching direction, is enhanced, whereby a very high stability can be also obtained.

Sixth Example

Figure 16:
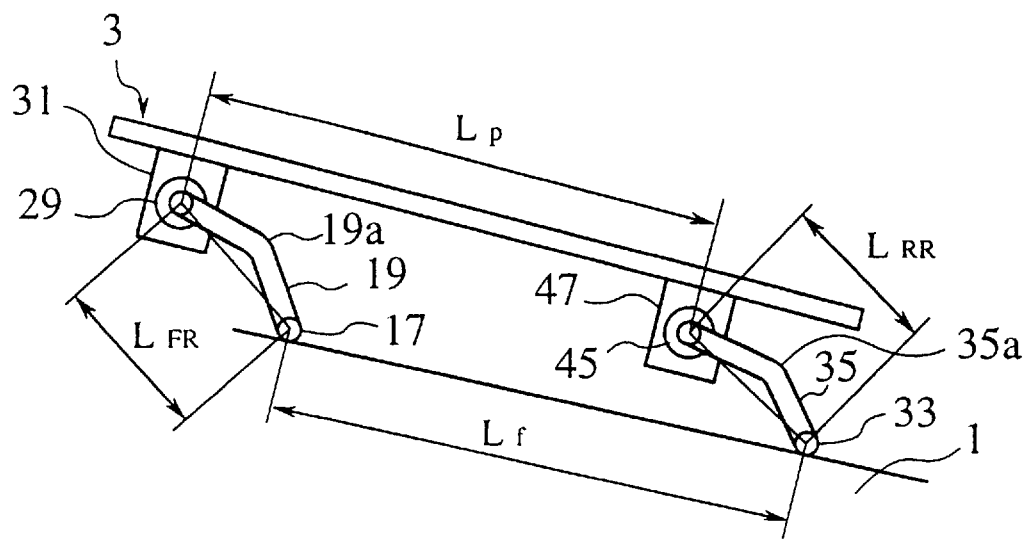
FIG. 16 is a schematic side view according to a sixth example of the present invention.

FIG. 16 shows a schematic side view according to the sixth example of the present invention. In this case, the sizes of the respective portions are determined as follows.

That is, $L_P$: Distance between the centers of the front and rear collars 29 and 45 of the support panel 3 (distance between the centers of the supporting portions of the respective arm sections 19 and 35), $L_f$: Distance between the centers of the torque bar sections 17 and 33 on the cushion frame 1 side, $L_{FR}$: arm length of the arm section of the front torsion bar 5 or 7 (arm length of one of the respective arm sections 19 and 35 forming the parallel link mechanism), $L_{RR}$: Arm length of the arm section of the rear torsion bar 9 or 11 (arm length of the other of the respective arm sections 19 and 35), Then the following size difference is set.

$$\Delta L = L_{FR} + L_f - (L_{RR} + L_p)$$

Then, the following relations are satisfied.

$$\Delta L_{LH} > 0 \text{ and, } \Delta L_{RH_{RH}} > 0$$

$$\{(\Delta L_{LH/LRR} + L_p)^2 + (\Delta L_{LR}/L_{RR} + L_p)^2\}^{1/2} \geq 0.0035$$

In this case, LH represents the seat left side, and RH represents the seat right side.

Thus, when such relations are satisfied, a shifting phenomenon which is described later, does not occur, load-bending properties which have a high linearity can be obtained.

Figure 17:
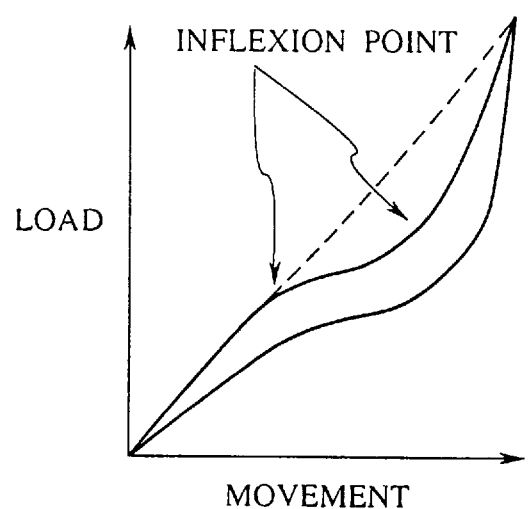
FIG. 17 is a graph according to the sixth example of the present invention.

Accordingly, it is possible to prevent sticking of the parallel link mechanism formed of the support panel 3, torsion bars 5, 7, 9 an 11, and cushion frame 1, by providing a rigidity reducing means, as in the above-mentioned first example. However, even if the parallel link mechanism does not stick to, by front and rear balances of the load, the load-bending properties are nonlinear, as shown in FIG. 17, and it is likely to give the occupant an uncomfortable sense, when seated.

Figure 18:
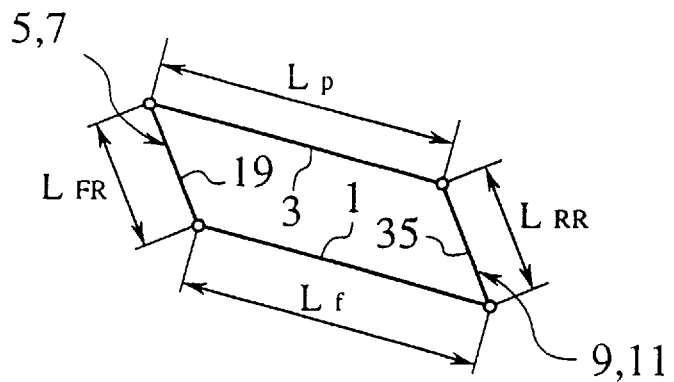
FIG. 18 is a skeleton view for explaining effects according to the sixth example of the present invention.
Figure 19:
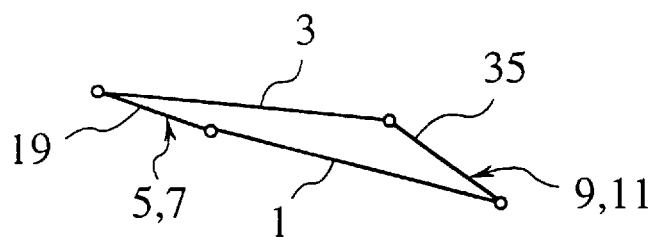
FIG. 19 is a skeleton view for explaining effects according to the sixth example of the present invention.
Figure 20:
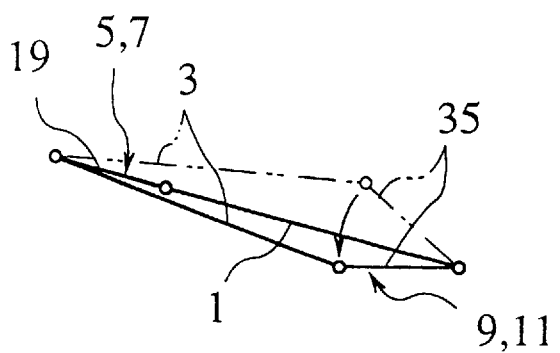
FIG. 20 is a skeleton view for explaining effects according to the sixth example of the present invention.

This is because, a so called shifting phenomenon occurs, that is, the front torsion bars 5 and 7 are bent greatly in a region where a load is small, at a certain position of the load center with respect to the seat, as shown in FIGS. 18 and 19, and the rear torsion bars 9 and 11 are rapidly moved, when reached a displacement, as shown in FIG. 20. In the sixth example, to improve the above-mentioned shifting phenomenon, an experiment relating to a case where torsion bars form a parallel link mechanism which is arranged in the seat longitudinal direction, has been made.

Figure 21:
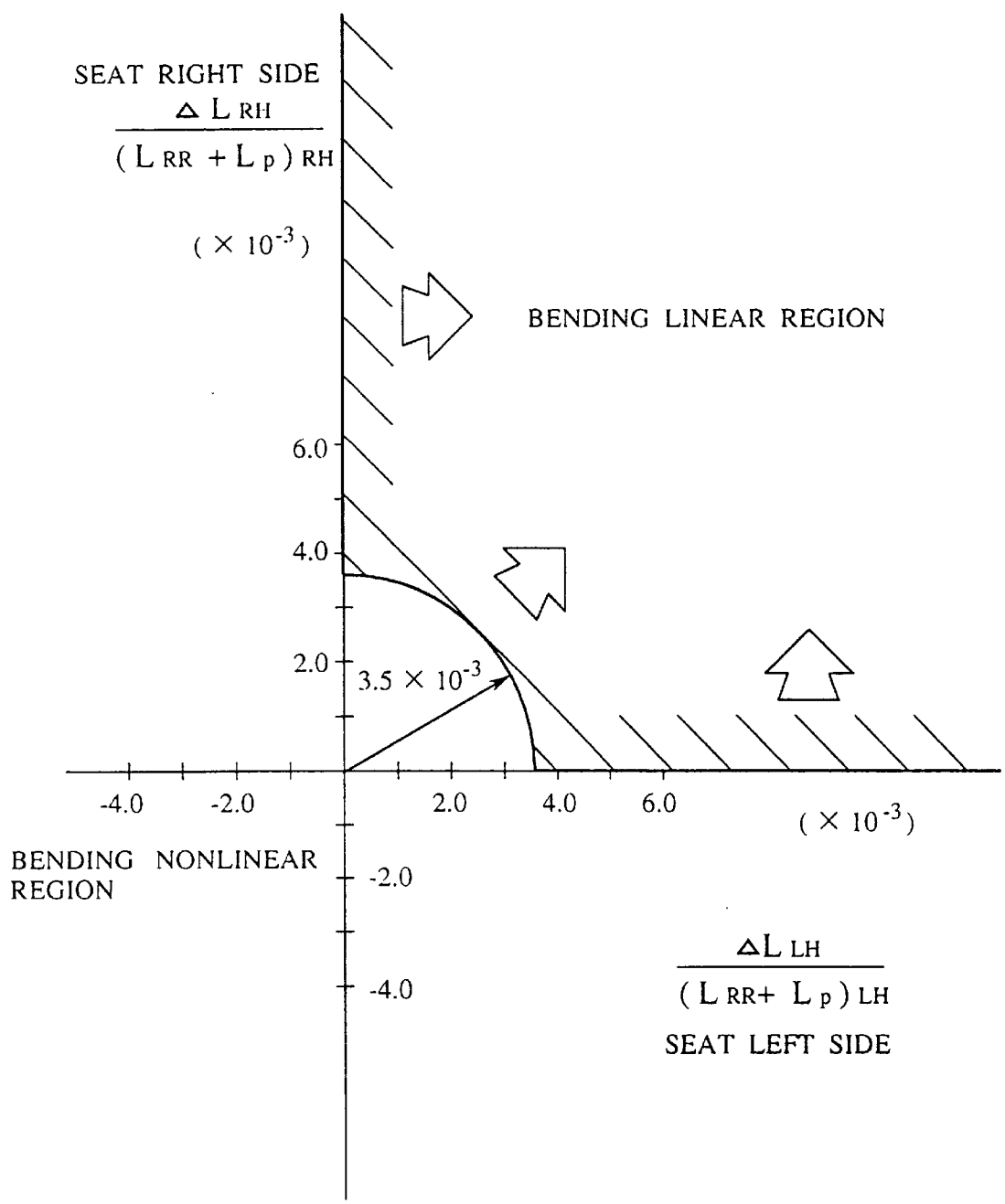
FIG. 21 is a graph according to the sixth example of the present invention.

Now, the size difference of $\Delta L$ is defined as mentioned above, $L_{FR}$ or $L_f$ relating to the left and right sides of the seat is changed, and relationships between $\Delta L$ and load-bending properties have been examined. After the results, in a case where, even in any one of the left and right sides, $\Delta L \leq O$ is satisfied, the shifting phenomenon shown in FIG. 20 occurs. However, by setting the arm length $L_{FR}$ of the arm section 19 of the front torsion bars 5 and 7 longer a little than the arm length $L_{RR}$ of the arm section 35 of the rear torsion bars 9 and 11 and further by setting as mentioned above, the shifting phenomenon does not occur, whereby a high linearity load-bending properties could be obtained as shown by a hatched region in FIG. 21. In a case of a set for a vehicle, there is provided a backrest, and the occupant's seat position is not shifted backward greatly. Thus, a shifting phenomenon of the front torsion bar does not occur, on the contrary to the example of FIG. 20. Therefore, by setting the sum of a distance between centers of the torque bar sections 17 and 33 of the cushion frame 1 side, and an arm length of the arm section 19 of the front torsion bar 5 or 7, to be larger than the sum of a distance between the centers of the collars 29 and 45, which is a distance between the support portion centers of the respective arm sections 19 and 35 for the support panel 3, and an arm length of the arm section 35 of the rear torsion bar 9 or 11, a more comfortable ride can be obtained. In this case, the magnitude and ratio of a necessary $\Delta L$ depend on the magnitude of rigidity of the arm sections 19 and 35, and the size ratio of the respective portions. Accordingly, the arc region ($3.5 \times 10^{-3}$) shown in FIG. 21 is slightly changed.

When the seat device is applied to a device other than the seat device for the vehicle, the respective magnitude of the front and rear arm length $L_{FR}$ and $L_{RR}$ can be reversed. Further, when a parallel link mechanisms is formed in the seat width direction, the same effects as described above can be obtained by setting an arm length between the seat width directional arm sections.

Thus, in the sixth example, substantially the same effects and operations as in the above-mentioned first example, can be also obtained. Additionally, the shifting phenomenon can be prevented, whereby a more comfortable ride can be obtained.

Although, in the respective examples described above, the parallel link mechanism of the torsion bar has been formed in the seat longitudinal direction, but it can be also formed in the seat width direction. Additionally, provision of four torsion bars at the four corners is not limited, and a pair of torsion bars can be provided in the seat longitudinal direction or in the seat width direction.

As described above, according to the first aspect of the invention, a relative movement between the torsion bar and the support member can be limited to only a relative rotation. Accordingly, friction between the torsion bar and the support member is further reduced, whereby a comfortable ride and vibration breaking properties can be improved by the smooth motion, and durability is also improved. Further, since the torsion bars are simply provided to form a parallel link mechanism, the structure of the seat device is extremely simple.

According to the second aspect of the invention, the torque bar of the torsion bar can be sufficiently extended in a limited space, whereby durability can be improved.

According to the third aspect of the invention, a load which acts on the tip portion of the arm section can be reduced by a rigidity reducing means, and the motion balance of at least one pair of torsion bars, which act as a spring, can be held. As a result, a comfortable ride can be obtained by a smooth motion. Further, friction between the arm section and the support panel can be suppressed by deformation of the arm sections or the like, and a comfortable ride and vibration breaking viz., attenuating properties can be improved. Particularly, since the rigidity reducing means reduces even the seat width directional rigidity, even if the parallelism of the parallel link is reduced, the stress can be absorbed, and the parallel link does not act as a bar stopper.

According to the fourth aspect of the invention, in addition to the effects of the third aspect of the invention, a simple structure can be obtained only by providing flex portions.

According to the fifth aspect of the invention, in addition to the effects of the aspect embodiment, reduction of rigidity can be easily controlled by setting the elastic body.

According to the sixth aspect of the invention, in addition to the effects of any one of the previous aspects of the invention, movement of at least one pair of torsion bars can be synchronized to each other with connecting members, and the rotational rigidity in the seat roll direction or pitching direction, can be enhanced. Accordingly, the stability of the seat can be increased.

According to the seventh aspect of the invention, in addition to the effects of any one of the previous aspects of the invention, friction between the cushion frame and the arm section can be prevented, and a more comfortable ride and vibration breaking properties are obtained, and further, the occurrence of irregular sounds can be prevented.

According to the eighth aspect of the invention, frictional engagement between the round portions between the torque bar section of the torsion bar and the arm section, and the cushion frame, can be prevented. Thus, more comfortable ride and vibration breaking properties are obtained, and further, the occurrence of irregular sounds can be prevented.

According to the ninth to eleventh aspects of the invention, in addition to the effects of any of the above aspects, a comfortable ride can be obtained.

According to the tenth aspect of the invention, the pressing force between the arm supporting bracket and the arm section can be suppressed and friction can be reduced. Thus, more comfortable ride and vibration attenuating properties are obtained.

We claim:

1. The seat device comprising:

a cushion frame;

a support member for supporting a seat pad; and a first pair of torsion bars for elastically supporting said support member on said cushion frame and each including a torque bar section and an arm section, one end of the arm section being operatively connected with the support member, and one end of the torque bar section being rigidly and immovably connected to said cushion frame so that rotational movement of the arm section in response to relative movement of said support member toward said cushion frame torques said torque bar section about its longitudinal axis in a manner which produces a resistance to the relative movement of said support member toward said cushion member, wherein respective arm sections of said first pair of torsion bars are oriented in essentially the same direction so as to be essentially parallel with each other and to form a parallel link mechanism, and further comprising another pair of torsion bars, wherein the pairs of torsion bars are arranged at opposite sides of said cushion frame and wherein the torque bar section of each pair of torsion bars is arranged with a slight offset with respect to other.

2. The seat device according to claim 1, further comprising at least one of a) a first rigidity reducing means for reducing a rigidity of the arm section and b) a second rigidity reducing means for reducing a rigidity of a connection between the arm section and the support member.

3. The seat device according to claim 2, wherein said first rigidity reducing means comprises a flex portion of the arm section.

4. The seat device according to claim 2, wherein said second rigidity reducing means comprises an elastic body operatively connected between the arm section and the support member.

5. The seat device comprising:

a cushion frame;

a support member for supporting a seat pad; and a first pair of torsion bars for elastically supporting said support member on said cushion frame and each including a torque bar section and an arm section, one end of the arm section being operatively connected with the support member, and one end of the torque bar section being rigidly and immovably connected to said cushion frame so that rotational movement of the arm section in response to relative movement of said support member toward said cushion frame torques said torque bar section about its longitudinal axis in a manner which produces a resistance to the relative movement of said support member toward said cushion member, wherein respective arm sections of said first pair of torsion bars are oriented in essentially the same direction so as to be essentially parallel with each other and to form a parallel link mechanism, and further comprising:

a second pair of torsion bars; and a connecting member for connecting the arm sections of the first pair of torsion bars, said connecting member being disposed on one of the opposite sides of the cushion frame to induce a substantially synchronous movement therebetween.

6. The seat device according to claim 5, wherein the opposite sides are front and rear sides of the cushion frame.

7. The seat device according to claim 1, further comprising means for relieving unevenness in motion of the arm section and for preventing interference with said cushion frame.

8. The seat device according to claim 1, wherein:

each torsion bar has a round portion between the torque bar section and the arm section; and wherein the seat device further comprises holding means for holding the respective torsion bar against the cushion frame along a length thereof between the end of the torque bar section and a vicinal point to the round portion.

9. The seat device according to claim 1, wherein the sum of the distance between centers of the torque bar sections of said torsion bars and one arm length of the respective arm sections forming the parallel link mechanism is larger than the sum of the distance between support portion centers of the respective arm sections for the support panel and the other arm length of the respective arm sections.

10. A seat device comprising:

a cushion frame;

a support member for supporting a seat pad; and a pair of torsion bars for elastically supporting said support member on said cushion frame, said torsion bars each having a torque bar section and an arm section, the torque bar section having an end which is rigidly secured to one of said cushion frame and said support member, the torque bar section being twisted about its longitudinal axis when the arm section, which is connected to the other of the cushion frame and said support member, is displaced by relative movement of said support member toward said cushion frame;

arm supporting brackets pivotally receiving free ends of the arm sections of said torsion bars; and rigidity reducing means for reducing a rigidity of a connection between said arm support brackets and the one of said cushion frame and said support member in a direction which extends essentially along a line which passes through both ends of said arm section of a corresponding torsion bar.

* * * * *